US012057072B2

(12) United States Patent
Guo et al.

(10) Patent No.: US 12,057,072 B2
(45) Date of Patent: Aug. 6, 2024

(54) PIXEL CIRCUIT WITH A COMPENSATION MODULE

(71) Applicant: YUNGU (GU'AN) TECHNOLOGY CO., LTD., Hebei (CN)

(72) Inventors: Enqing Guo, Hebei (CN); Kangguan Pan, Hebei (CN); Cuili Gai, Hebei (CN); Fa-Hsyang Chen, Hebei (CN); Rubo Xing, Hebei (CN); Gang Wang, Hebei (CN); Junfeng Li, Hebei (CN)

(73) Assignee: YUNGU (GU'AN) TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 18/240,684

(22) Filed: Aug. 31, 2023

(65) Prior Publication Data

US 2023/0410744 A1 Dec. 21, 2023

Related U.S. Application Data

(63) Continuation of application No. PCT/CN2022/089523, filed on Apr. 27, 2022.

(30) Foreign Application Priority Data

Sep. 18, 2021 (CN) .......................... 202111100960.1

(51) Int. Cl.
*G09G 3/3233* (2016.01)
*G09G 3/3283* (2016.01)

(52) U.S. Cl.
CPC ......... *G09G 3/3233* (2013.01); *G09G 3/3283* (2013.01); *G09G 2300/0819* (2013.01);
(Continued)

(58) Field of Classification Search
CPC .................................................... G09G 3/3233
See application file for complete search history.

(56) References Cited

U.S. PATENT DOCUMENTS

| | | | |
|---|---|---|---|
| 10,964,264 | B1 | 3/2021 | Kim |
| 2011/0157126 | A1 | 6/2011 | Chung et al. |

FOREIGN PATENT DOCUMENTS

| | | | |
|---|---|---|---|
| CN | 107452339 | A | 12/2017 |
| CN | 107665672 | A | 2/2018 |

(Continued)

OTHER PUBLICATIONS

International Search Report issued on Jul. 18, 2023, in corresponding International Patent Application No. PCT/CN2022/089523, 5 pages.

(Continued)

*Primary Examiner* — Gustavo Polo
(74) *Attorney, Agent, or Firm* — Maier & Maier, PLLC

(57) ABSTRACT

A pixel circuit, a driving method therefor, and a display panel. The pixel circuit includes a drive module, a data write module, a compensation module, a current leakage suppression module, and a first storage module. A first terminal of the compensation module is electrically connected to a second terminal of the drive module. The control terminal of the compensation module accesses a first light emission control signal. A first terminal of the current leakage suppression module is electrically connected to the control terminal of the drive module. A second terminal of the current leakage suppression module is electrically connected to a second terminal of the compensation module. The control terminal of the current leakage suppression module accesses the first light emission control signal. A first terminal of the first storage module is electrically connected to the second terminal of the compensation module.

20 Claims, 10 Drawing Sheets

(52) U.S. Cl.
CPC ............... *G09G 2300/0842* (2013.01); *G09G 2320/0247* (2013.01); *G09G 2330/021* (2013.01)

(56) References Cited

FOREIGN PATENT DOCUMENTS

| | | | |
|---|---|---|---|
| CN | 110264946 | A | 9/2019 |
| CN | 110942743 | A | 3/2020 |
| CN | 112233619 | A | 1/2021 |
| CN | 112289267 | A | 1/2021 |
| CN | 112289269 | A | 1/2021 |
| CN | 112735314 | A | 4/2021 |
| CN | 112908265 | A | 6/2021 |
| CN | 112992055 | A | 6/2021 |
| CN | 113870758 | A | 12/2021 |
| KR | 20200015862 | A | 2/2020 |

OTHER PUBLICATIONS

Office Action issued on Jun. 23, 2022 in corresponding Chinese Patent Application No. 202111100960.1, 25 pages.

PIXEL CIRCUIT WITH A COMPENSATION MODULE

CROSS-REFERENCE TO RELATED APPLICATIONS

This application is a continuation of International Patent Application No. PCT/CN2022/089523, filed on Apr. 27, 2022, which claims priority to Chinese Patent Application No. 202111100960.1 filed on Sep. 18, 2021, disclosures of both of which are incorporated herein by reference in their entireties.

TECHNICAL FIELD

Embodiments of the present application relate to the field of display technology, for example, a pixel circuit, a driving method therefor, and a display panel.

BACKGROUND

With the continuous development of display technology, people's requirements for a display panel are getting higher and higher. The display panel is developed in a direction of high display quality, multiple frame rate modes, and low power consumption. The power consumption of a display panel mainly lies in a pixel circuit and a light emission device. For a pixel circuit, the power consumption may be reduced by reducing a frame rate. However, when the refresh rate of a display panel is reduced, there is a current leakage problem in the pixel circuit. As a result, a display image flashes, which affects the display quality of the display panel.

SUMMARY

Embodiments of the present application provide a pixel circuit, a driving method therefor, and a display panel to alleviate the current leakage problem of the pixel circuit at a low refresh rate, thereby implementing the effect of low power consumption and high display quality.

The embodiments of the present application provide the technical solutions below.

The pixel circuit includes a drive module, a data write module, a compensation module, a current leakage suppression module, and a first storage module.

The drive module includes a control terminal, a first terminal, and a second terminal.

The data write module includes a scan control terminal, a first terminal, and a second terminal. The first terminal of the data write module is electrically connected to the first terminal of the drive module. The second terminal of the data write module accesses a data signal. The scan control terminal of the data write module accesses a first scan signal.

The compensation module includes a control terminal, a first terminal, and a second terminal. The first terminal of the compensation module is electrically connected to the second terminal of the drive module. The control terminal of the compensation module accesses a first light emission control signal.

The current leakage suppression module includes a control terminal, a first terminal, and a second terminal. The first terminal of the current leakage suppression module is electrically connected to the control terminal of the drive module. The second terminal of the current leakage suppression module is electrically connected to the second terminal of the compensation module. The control terminal of the current leakage suppression module accesses the first light emission control signal. The current leakage suppression module and the compensation module are turned on in an initialization stage and a data write stage.

The first storage module includes a first terminal and a second terminal. The first terminal of the first storage module is electrically connected to the second terminal of the compensation module. The second terminal of the first storage module accesses a reference voltage signal. The first storage module is configured to maintain the voltage difference formed between the first terminal of the first storage module and the second terminal of the first storage module unchanged in the data write stage and a light emission stage.

The present application also provides a display panel. The display pane includes the pixel circuit according to any embodiment of the present application.

The present application also provides a driving method of a pixel circuit. This method is applied to the pixel circuit according to any embodiment of the present application. The driving method includes the steps below.

During an initialization stage, the first light emission control signal controls the compensation module and the current leakage suppression module to be turned on, so that in the case where the first terminal of the drive module and the second terminal of the drive module access different voltages separately, the drive module is turned on for initialization.

During a data write stage, the first light emission control signal controls the compensation module and the current leakage suppression module to be turned on, and the first scan signal controls the data write module to be turned on, so that the data signal is written into the control terminal of the drive module. The potential of the first terminal of the first storage module and the potential of the control terminal of the drive module are equal. A voltage difference is formed between the first terminal of the first storage module and the second terminal of the first storage module.

During a light emission stage, the first light emission control signal controls the compensation module and the current leakage suppression module to be turned off. The first scan signal controls the data write module to be turned off. The first storage module maintains the voltage difference between the first terminal of the first storage module and the second terminal of the first storage module unchanged, so that the potential of the first terminal of the current leakage suppression module and the potential of the second terminal of the current leakage suppression module are equal.

In the embodiments of the present application, the current leakage suppression module is disposed between the control terminal of the drive module and the second terminal of the compensation module, and the first storage module is disposed between the reference voltage signal and the second terminal of the compensation module. In this manner, the control terminal of the drive module is formed with only one leakage current channel. The channel is connected to the control terminal of the drive module and the second terminal of the drive module. The channel is composed of the current leakage suppression module and the compensation module controlled by the first light emission control signal. Only when the potential of the second terminal of the compensation module drifts greatly, the leakage suppression module may generate a large leakage current, and the potential of the control terminal of the drive module may drift. Moreover, in the embodiments of the present application, the potential of the control terminal of the drive module is close to the potential of the second terminal of the compensation module, so that the leakage current of the current leakage suppression module is small, and the magnitude of the leakage current of the unique leakage channel is reduced. Thus, the potential of the control terminal of the drive module is more stable, and a high current retention rate is implemented, thereby alleviating the flicker phenomenon of the display panel.

In the embodiments of the present application, the reset path and the reset method of the control terminal of the drive module are improved in a breakthrough manner. The combination of the first storage module and the current leakage suppression module effectively suppresses the current leakage of the control terminal of the drive module. Thus, it is beneficial to implement high-quality display at a low frame rate, thereby implementing the effect of low power consumption and high display quality.

The preceding effect is implemented, and at the same time, in the pixel circuit provided in the embodiments of the present application, in the initialization stage, in the case where the first terminal of the drive module and the second terminal of the drive module access different voltages separately, for example, the first terminal of the drive module accesses a first power signal, and the second terminal of the drive module accesses a second power signal, the drive module is turned on, and a relatively large current flows. The control terminal of the drive module is initialized, and at the same time, the bias voltage state of the drive module is alleviated, thereby alleviating an afterimage problem.

DETAILED DESCRIPTION

Figure 1:
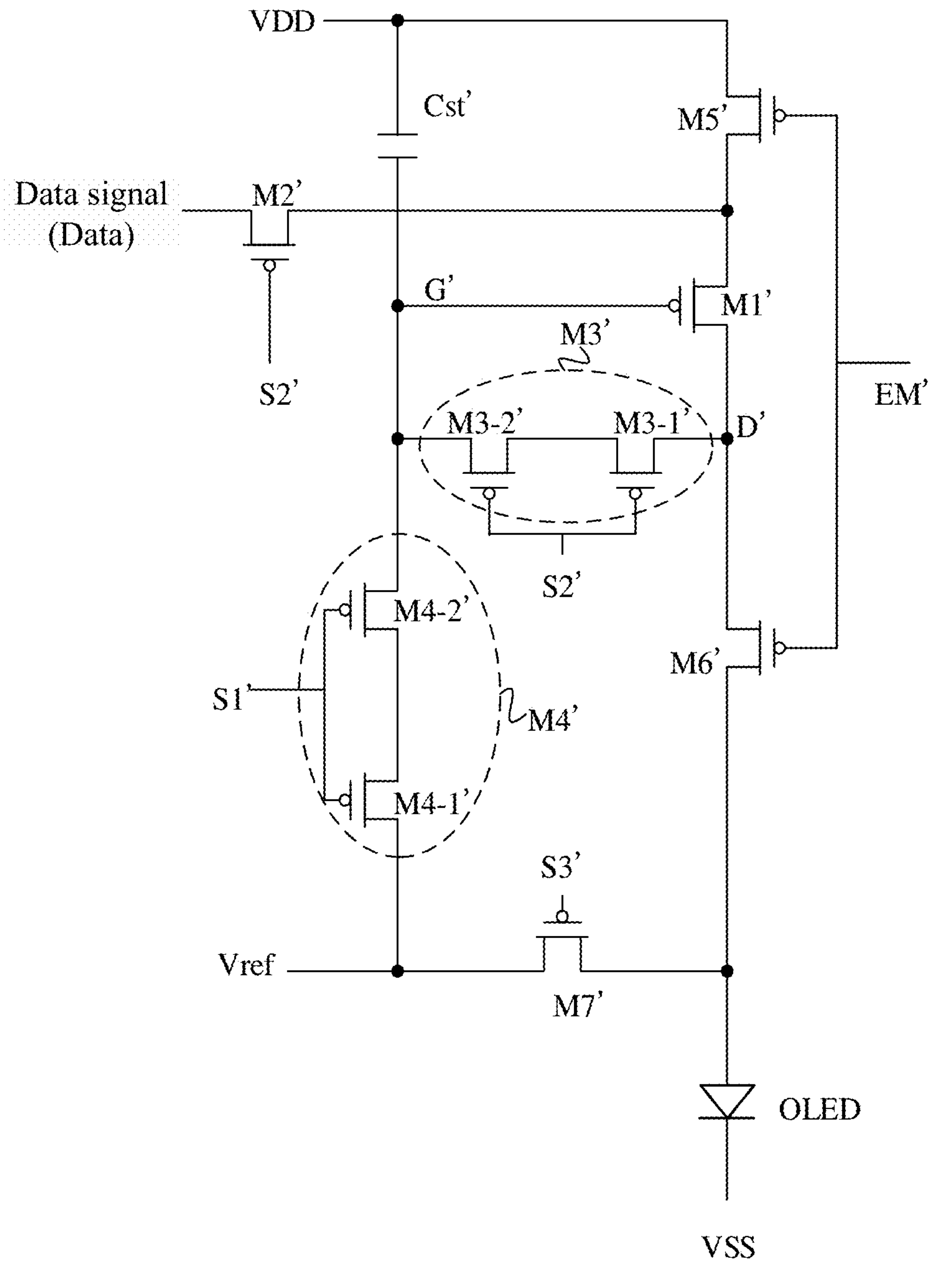
FIG. 1 is a circuit diagram of a pixel circuit.

The present application is described below in conjunction with drawings and embodiments. It is to be understood that the embodiments set forth below are merely intended to illustrate and not to limit the present application. Additionally, it is to be noted that for ease of description, only part, not all, of structures related to the present application are illustrated in the drawings.

Figure 2:
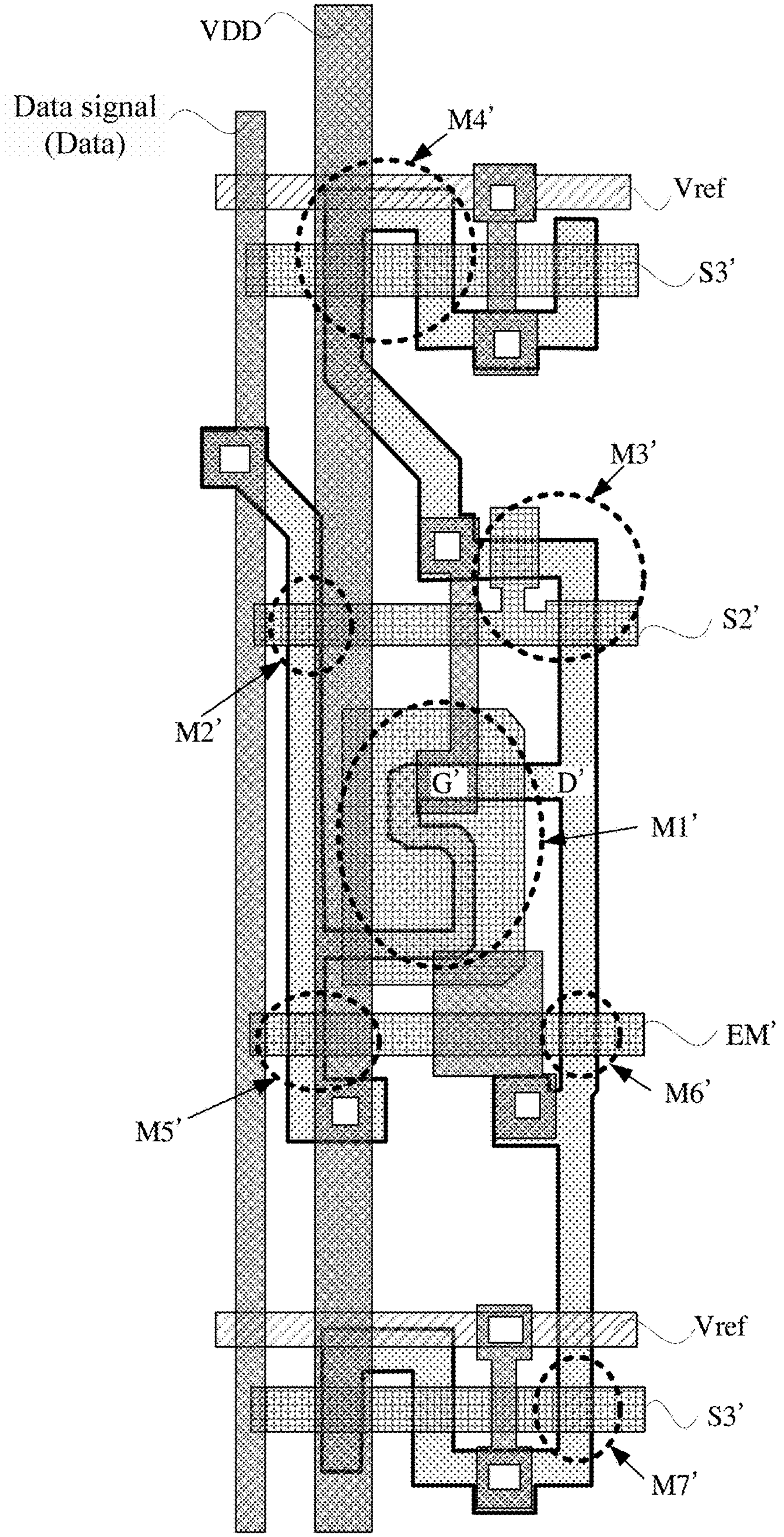
FIG. 2 is a layout diagram of the pixel circuit shown in FIG. 1.

Referring to FIGS. 1 and 2, the pixel circuit is a 7T1C structure. The pixel circuit includes a transistor M1', a transistor M2', a transistor M3', a transistor M4', a transistor M5', a transistor M6', a transistor M7', and a capacitor Cst'. For example, all transistors are p-type transistors and are made by a low-temperature polycrystalline silicon (LTPS) process. An LTPS transistor has the advantages of high mobility, high drive capability, and low process costs and is widely used in pixel circuits. However, the disadvantage of the LTPS transistor is that a leakage current is large. As a result, the drive current generated by a pixel circuit fluctuates greatly. The reason is that the transistor M1' is a drive transistor, and the voltage of the gate G' of the transistor M1' is stored by the capacitor Cst', but there are two leakage current channels in the gate G', that is, a current is leaked through the transistor M3' and the transistor M4'. Generally, a current leaks in from a drain D' through the transistor M3', and the current leaks out from a reference voltage signal Vref through the transistor M4'. Due to the limitation of the potential difference of multiple nodes, it is difficult to completely offset the leakage in and out of the leakage current of the gate G'. As a result, the potential of the gate G fluctuates greatly, and the drive current of the transistor M1' fluctuates greatly.

To solve the technical problems, further referring to FIG. 1, the first improvement scheme is to change the transistors of two leakage current channels into a double-gate transistor. The transistor M3' is equivalent to a transistor M3-1' and a transistor M3-2' connected in series. The transistor M4' is equivalent to a transistor M4-1' and a transistor M4-2' connected in series. Compared to a single-gate transistor, a double-gate transistor has a lower leakage current. Thus, the potential fluctuation of the gate G' can be reduced to a certain extent. However, the current leakage effect of this scheme is not alleviated well.

The second improvement scheme is to change the transistors of two leakage current channels into low temperature polycrystalline oxide (LTPO) transistors. Compared to an LTPS transistor, an LTPO transistor has the advantage of a small leakage current and can better solve the problem caused by the leakage current of the gate G'. However, in this scheme, the process of oxide thin-film transistors is added in the preparation process of a display panel, resulting in a significant increase in process costs.

Figure 3:
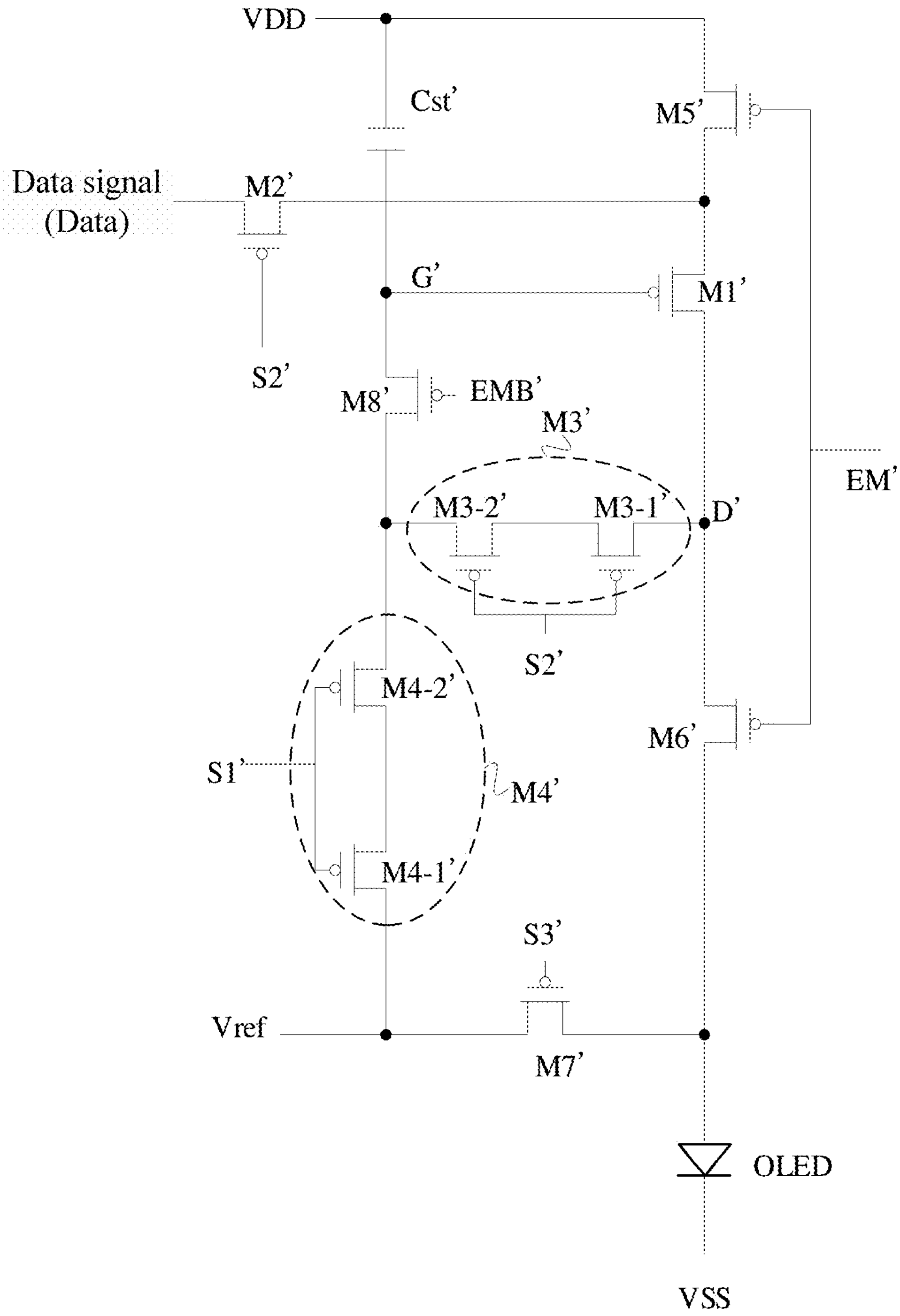
FIG. 3 is a circuit diagram of another pixel circuit.
Figure 4:
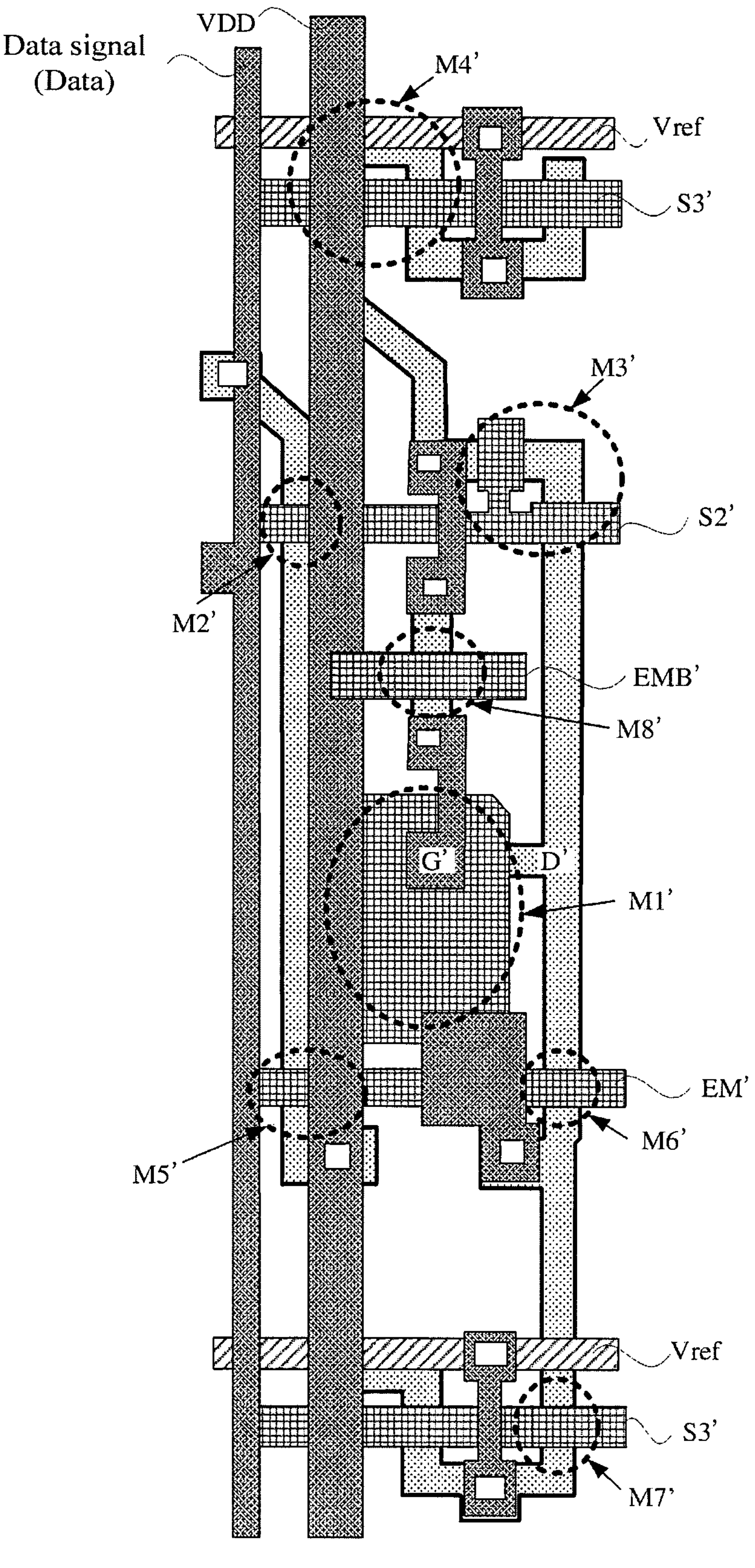
FIG. 4 is a layout diagram of the pixel circuit shown in FIG. 3.

Referring to FIGS. 3 and 4, the third improvement scheme is to add a transistor M8' to a 7T1C circuit to obtain an 8T1C circuit. Compared to the first improvement scheme, this scheme further alleviates the current leakage problem of the gate G'. However, it can be seen from comparison between FIG. 2 and FIG. 4 that this scheme needs to increase a light emission control signal EMB' based on the 7T1C circuit layout. Thus, the layout of this scheme is relatively complicated.

In summary, the preceding pixel circuit cannot balance multiple effects such as low power consumption, a low leakage current, low costs, and a simple layout.

Figure 5:
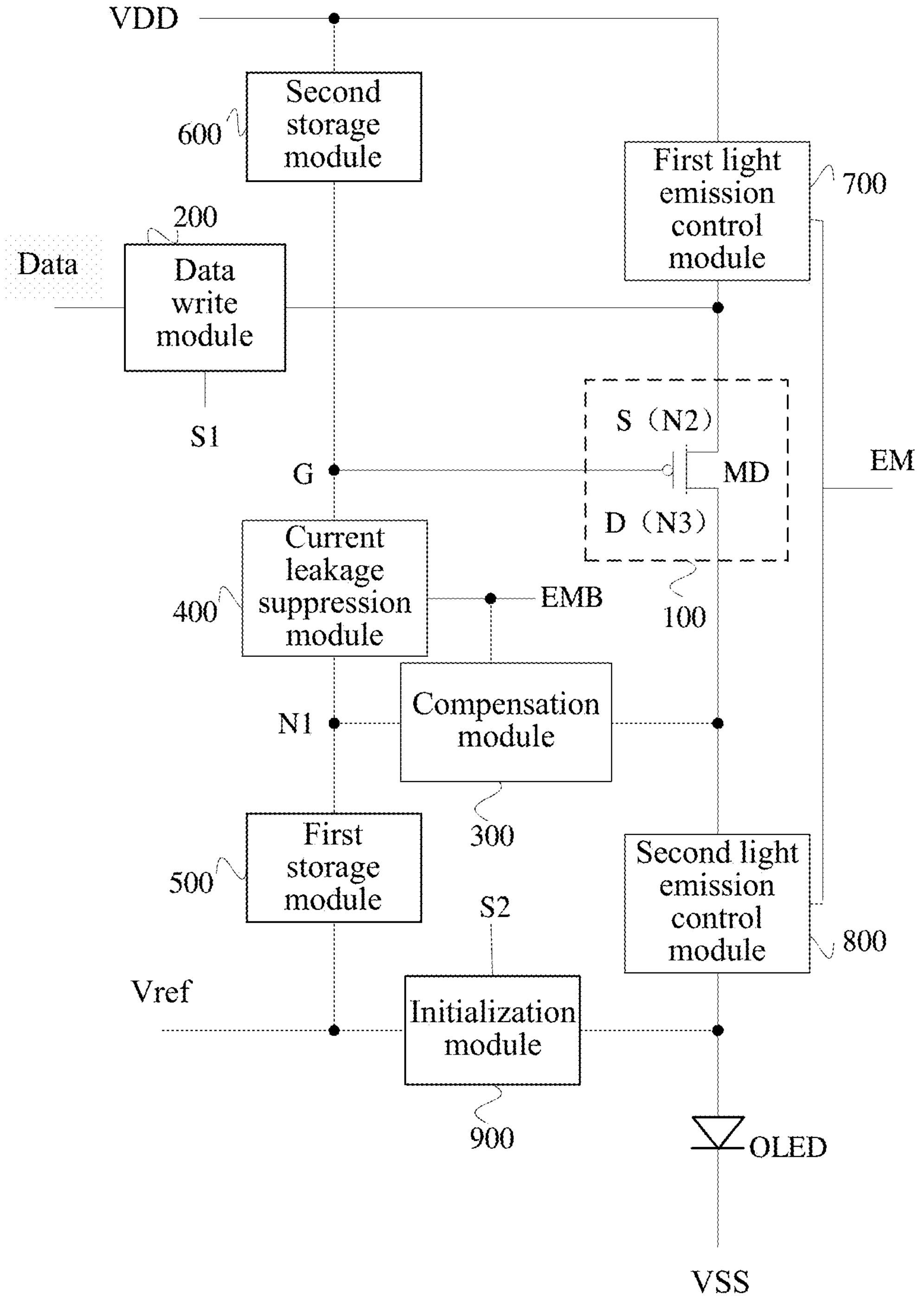
FIG. 5 is a diagram illustrating the structure of a pixel circuit according to an embodiment of the present application.

An embodiment of the present application provides a pixel circuit. Referring to FIG. 5, the pixel circuit includes a drive module 100, a data write module 200, a compensation module 300, a current leakage suppression module 400, and a first storage module 500. The drive module 100 includes a control terminal, a first terminal, and a second terminal. In an embodiment, the drive module 100 includes a drive transistor MD. Description is given by using an example in which the drive transistor MD is a p-type transistor. The gate G of the drive transistor MD is the control terminal of the drive module 100. The source S of the drive transistor MD is a second node N2, that is, the first terminal of the drive module 100. The drain D of the drive transistor MD is a third node N3, that is, the second terminal of the drive module 100. If the gate G and the drain D of the drive transistor MD are turned on, the drive transistor MD constitutes a diode connection mode. When the source S is at a high level, and the drain D is at a low level, the drive transistor MD is turned on, and a drive current is generated.

The data write module 200 includes a scan control terminal, a first terminal, and a second terminal. The first terminal of the data write module 200 is electrically connected to the first terminal of the drive module 100. The second terminal of the data write module 200 accesses a data signal Data. The scan control terminal of the data write module 200 accesses a first scan signal S1. The compensation module 300 includes a control terminal, a first terminal, and a second terminal. The first terminal of the compensation module 300 is electrically connected to a second terminal of the drive module 100. The second terminal of the compensation module 300 is a first node N1. The control terminal of the compensation module 300 accesses a first light emission control signal EMB. The current leakage suppression module 400 includes a control terminal, a first terminal, and a second terminal. The first terminal of the current leakage suppression module 400 is electrically connected to the control terminal (gate G) of the drive module 100. The second terminal of the current leakage suppression module 400 is electrically connected to the second terminal (first node N1) of the compensation module 300. The control terminal of the current leakage suppression module 400 accesses the first light emission control signal EMB. The first storage module 500 includes a first terminal and a second terminal. The first terminal of the first storage module 500 is electrically connected to the second terminal (first node N1) of the compensation module 300. The second terminal of the first storage module 500 accesses a reference voltage signal Vref.

As shown in FIG. 5, the drive process of the pixel circuit includes an initialization stage, a data write stage, and a light emission stage. Since the current leakage suppression module 400 and the compensation module 300 access the first light emission control signal EMB, the on and off states of the two are the same. The first light emission control signal EMB controls the current leakage suppression module 400 and the compensation module 300 to be turned on in the initialization stage and the data write stage. The first storage module 500 is configured to maintain the voltage difference formed between the first terminal of the first storage module 500 and the second terminal of the first storage module 500 unchanged in the data write stage and the light emission stage.

In the initialization stage, the current leakage suppression module 400 and the compensation module 300 are turned on, and the second terminal of the drive module 100 and the control terminal (gate G) of the drive module 100 are turned on. The drive module 100 constitutes a diode connection mode. In the case where the first terminal of the drive module 100 and the second terminal of the drive module 100 access different voltages separately, for example, the first terminal of the drive module 100 accesses a first power signal, and the second terminal of the drive module 100 accesses a second power signal, the drive module 100 is turned on, and a relatively large current flows. The control terminal (gate G) of the drive module 100 is initialized, and at the same time, the bias voltage state of the drive module 100 is alleviated, thereby alleviating an afterimage problem.

In the data write stage, the data write module 200, the current leakage suppression module 400, and the compensation module 300 are turned on. The data signal Data is written into the control terminal (gate G) of the drive module 100 through the data write module 200, the turned-on drive module 100, the compensation module 300, and the current leakage suppression module 400. Since the current leakage suppression module 400 is in an on state, the potential of the control terminal (gate G) of the drive module 100 and the potential of the first node N1 are equal and change synchronously. At the same time, a voltage difference is formed between the first terminal of the first storage module 500 and the second terminal of the first storage module 500. The second terminal of the first storage module 500 is a constant reference voltage signal Vref. The first terminal of the first storage module 500 stores the potential of the first node N1. When the potential of the control terminal (gate G) of the drive module 100 is constant, and the potential of the first node N1 also no longer changes, a fixed voltage difference is formed between the first terminal of the first storage module 500 and the second terminal of the first storage module 500.

In the light emission stage, the data write module 200, the current leakage suppression module 400, and the compensation module 300 are all turned off. The first storage module 500 maintains the voltage difference between the first terminal of the first storage module 500 and the second terminal of the first storage module 500 unchanged. Since the second terminal of the first storage module 500 accesses the reference voltage signal Vref of which the potential is constant, the potential of the first terminal of the first storage module 500 (that is, the first node N1) is maintained as the potential in the data write stage. Since the control terminal (gate G) of the drive module 100 is also maintained as the potential in the data write stage, the potential of the first terminal of the current leakage suppression module 400 and the potential of the second terminal of the current leakage suppression module 400 are maintained equal, thereby reducing the leakage current of the current leakage suppression module 400 and suppressing the current leakage of the control terminal (gate G) of the drive module 100.

As can be seen from the preceding analysis, in this embodiment of the present application, the current leakage suppression module 400 is disposed between the control terminal (gate G) of the drive module 100 and the second terminal (first node N1) of the compensation module 300, and the first storage module 500 is disposed between the reference voltage signal Vref and the second terminal (first node N1) of the compensation module 300. In this manner, the control terminal (gate G) of the drive module 100 is formed with only one leakage current channel. The channel is connected to the control terminal of the drive module 100 and the second terminal of the drive module 100. The channel is composed of the current leakage suppression module 400 and the compensation module 300 controlled by the first light emission control signal. Only when the potential of the second terminal (first node N1) of the compensation module 300 drifts greatly, the leakage suppression module 400 may generate a large leakage current, and the potential of the control terminal (gate G) of the drive module 100 may drift. Moreover, in this embodiment of the present application, the potential of the control terminal (gate G) of the drive module 100 is close to the potential of the second terminal (first node N1) of the compensation module 300, so that the leakage current of the current leakage suppression module 400 is small, and the magnitude of the leakage current of the unique leakage channel is reduced. Thus, the potential of the control terminal (gate G) of the drive module 100 is more stable, and a high current retention rate is implemented, thereby alleviating the flicker phenomenon of the display panel.

In this embodiment of the present application, the reset path and the reset method of the control terminal (gate G) of the drive module 100 are improved in a breakthrough manner. The first storage module 500 is used to replace the double-gate transistor of the control terminal (gate G) of a reset drive module 100. The combination of the first storage module 500 and the current leakage suppression module 400 effectively suppresses the current leakage of the control terminal (gate G) of the drive module 100. Thus, it is beneficial to implement high-quality display at a low frame rate, thereby implementing the effect of low power consumption and high display quality.

The preceding effect is implemented, and at the same time, in the pixel circuit provided in this embodiment of the present application, in the initialization stage, in the case where the first terminal of the drive module 100 and the second terminal of the drive module 100 access different voltages separately, for example, the first terminal of the drive module 100 accesses the first power signal, and the second terminal of the drive module 100 accesses the second power signal, the drive module 100 is turned on, and a relatively large current flows. The control terminal (gate G) of the drive module 100 is initialized, and at the same time, the bias voltage state of the drive module 100 is alleviated, thereby alleviating the afterimage problem.

The case where the first terminal of the drive module 100 and the second terminal of the drive module 100 access different voltages separately, and the drive module 100 generates a relatively large current is described below.

Further referring to FIG. 5, on the basis of the preceding embodiment, in another embodiment, the pixel circuit also includes a first light emission control module 700, a second light emission control module 800, and an initialization module 900. The first light emission control module 700 includes a control terminal, a first terminal, and a second terminal. The first terminal of the first light emission control module 700 is electrically connected to the first terminal (second node N2) of the drive module 100. The second terminal of the first light emission control module 700 accesses a first power signal VDD. The control terminal of the first light emission control module 700 accesses a second light emission control signal EM. The second light emission control module 800 includes a control terminal, a first terminal, and a second terminal. The control terminal of the second light emission control module 800 accesses the second light emission control signal EM. The first terminal of the second light emission control module 800 is electrically connected to the second terminal (third node N3) of the drive module 100. The second terminal of the second light emission control module 800 is electrically connected to a light emission device OLED. The light emission device OLED includes an anode and a cathode. For example, the second terminal of the second light emission control module 800 is electrically connected to the anode of the light emission device OLED. The cathode of the light emission device OLED accesses a second power signal VSS.

The initialization module 900 includes a control terminal, a first terminal, and a second terminal. The control terminal of the initialization module 900 accesses a second scan signal S2. The first terminal of the initialization module 900 is electrically connected to the second terminal of the second light emission control module 800. The second terminal of the initialization module 900 accesses an initialization signal. In an embodiment, the reference voltage signal Vref is multiplexed as the initialization signal.

In the initialization stage, the current leakage suppression module 400 and the compensation module 300 are turned on. The drive module 100 constitutes a diode connection mode. The first light emission control module 700, the second light emission control module 800, and the initialization module 900 are turned on at the same time. The first power signal VDD is written to the first terminal (second node N2) of the drive module 100 through the first light emission control module 700. The second power signal VSS is written to the second terminal (third node N3) of the drive module 100 through the second light emission control module 800. The drive module 100 is turned on, and a large current is generated. This current flows out through the initialization module 900 and does not flow through the light emission device OLED, so that the anode of the light emission device OLED can be initialized, and the light emission device OLED is prevented from being turned on in the initialization stage.

It can be seen that in the pixel circuit provided in this embodiment of the present application, in the initialization stage, the drive module is controlled to generate a large current, and the generated large current flows out through the initialization module 900. The control terminal (gate G) of the drive module 100 and the anode of the light emission device OLED are initialized, and at the same time, the bias voltage state of the drive module 100 is alleviated, thereby alleviating the afterimage problem.

Further referring to FIG. 5, on the basis of the preceding embodiment, in another embodiment, the pixel circuit also includes a second storage module 600. The second storage module 600 includes a first terminal and a second terminal. The first terminal of the second storage module 600 is electrically connected to the control terminal (gate G) of the drive module 100. The second terminal of the second storage module 600 accesses the first power signal VDD. The second storage module 600 has the function of storing a potential and is configured to maintain the potential of the control terminal of the drive module 100 unchanged in the light emission stage. In this manner, the first storage module 500 and the second storage module 600 cooperate with each other. The first storage module 500 maintains the potential of the first node N1 unchanged. The second storage module 600 maintains the potential of the control terminal (gate G) of the drive module 100 unchanged. Thus, the potential of the first node N1 and the potential of the gate G maintain equal, thereby further reducing the current leakage of the control terminal (gate G) of the drive module 100. Moreover, the high current retention rate is implemented, and the flicker phenomenon of the display panel is alleviated.

Figure 6:
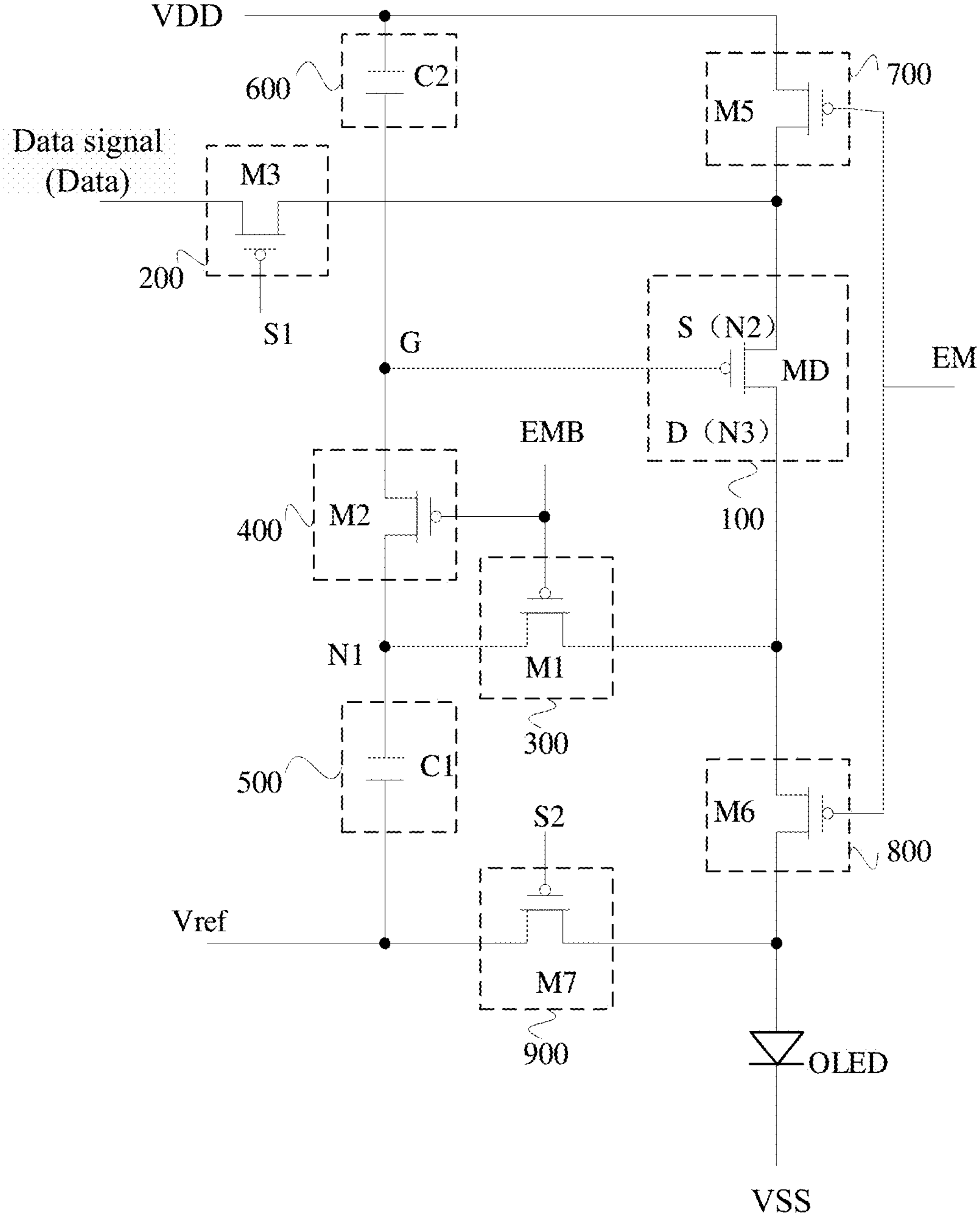
FIG. 6 is a diagram illustrating the structure of another pixel circuit according to an embodiment of the present application.

Referring to FIG. 6, on the basis of the preceding embodiment, this embodiment of the present application describes the disposition method of transistors in multiple modules.

In an embodiment of the present application, the compensation module 300 includes a first transistor M1. A first pole of the first transistor M1 is electrically connected to the second terminal (third node N3) of the drive module 100. A second pole of the first transistor M1 is electrically connected to the second terminal (first node N1) of the current leakage suppression module 400. The gate of the first transistor M1 accesses the first light emission control signal EMB. In this embodiment of the present application, the compensation module 300 is configured to include only one transistor. The circuit structure is simple and easy to implement.

Further referring to FIG. 6, in an embodiment of the present application, the current leakage suppression module 400 includes a second transistor M2. A first pole of the second transistor M2 is electrically connected to the control terminal (gate G) of the drive module 100. A second pole of the second transistor M2 is electrically connected to the second terminal (first node N1) of the compensation module 300. The gate of the second transistor M2 accesses the first light emission control signal EMB. In this embodiment of the present application, the current leakage suppression module 400 is configured to include only one transistor. The circuit structure is simple and easy to implement.

Further referring to FIG. 6, in an embodiment of the present application, the data write module 200 includes a third transistor M3. A first pole of the third transistor M3 is electrically connected to the first terminal (second node N2) of the drive module 100. A second pole of the third transistor M3 accesses the data signal Data. The gate of the third transistor M3 accesses the first scan signal S1. In this embodiment of the present application, the data write module 200 is configured to include only one transistor, so that the number of transistors required by the pixel circuit is less.

Further referring to FIG. 6, in an embodiment of the present application, the first light emission control module 700 includes a fifth transistor M5. A first pole of the fifth transistor M5 is electrically connected to the first terminal (second node N2) of the drive module 100. A second pole of the fifth transistor accesses the first power signal VDD. The gate of the fifth transistor M5 accesses the second light emission control signal EM. In this embodiment of the present application, the first light emission control module 700 is configured to include only one transistor. The circuit structure is simple and easy to implement.

Further referring to FIG. 6, in an embodiment of the present application, the second light emission control module 800 includes a sixth transistor M6. A first pole of the sixth transistor M6 is electrically connected to the second terminal of the drive module 100. A second pole of the sixth transistor M6 is electrically connected to the light emission device OLED. The gate of the sixth transistor M6 accesses the second light emission control signal EM. In this embodiment of the present application, the second light emission control module 800 is configured to include only one transistor. The circuit structure is simple and easy to implement.

Further referring to FIG. 6, in an embodiment of the present application, the initialization module 900 includes a seventh transistor M7. A first pole of the seventh transistor M7 is electrically connected to the second terminal of the second light emission control module 800. A second pole of the seventh transistor M7 accesses the initialization signal. The gate of the seventh transistor M7 accesses the second scan signal S2. In this embodiment of the present application, the initialization module 900 is configured to include only one transistor. The circuit structure is simple and easy to implement.

Further referring to FIG. 6, in an embodiment of the present application, the first storage module 500 includes a first capacitor C1. A first pole of the first capacitor C1 is electrically connected to the second terminal (first node N1) of the compensation module 300. A second pole of the first capacitor C1 accesses the reference voltage signal Vref. In this embodiment of the present application, the first storage module 500 is configured to include only one capacitor. The circuit structure is simple and easy to implement.

Further referring to FIG. 6, in an embodiment of the present application, the second storage module 600 includes a second capacitor C2. A first pole of the second capacitor C2 is electrically connected to the control terminal (gate G) of the drive module 100. A second pole of the second capacitor C2 accesses the first power signal VDD. In this embodiment of the present application, the second storage module 600 is configured to include only one capacitor. The circuit structure is simple and easy to implement.

FIG. 6 exemplarily shows that all the transistors in the pixel circuit are p-type transistors prepared by an LTPS process. This is not limited in the present application. In other embodiments, some or all of the transistors in the pixel circuit may also be configured as n-type transistors and may be configured according to requirements in practical applications.

FIG. 6 exemplarily shows that each of the first transistor M1 and the second transistor M2 is a single-gate transistor. This is not limited in the present application. In other embodiments, the first transistor M1 and/or the second transistor M2 may also be configured as a double-gate transistor.

Figure 7:
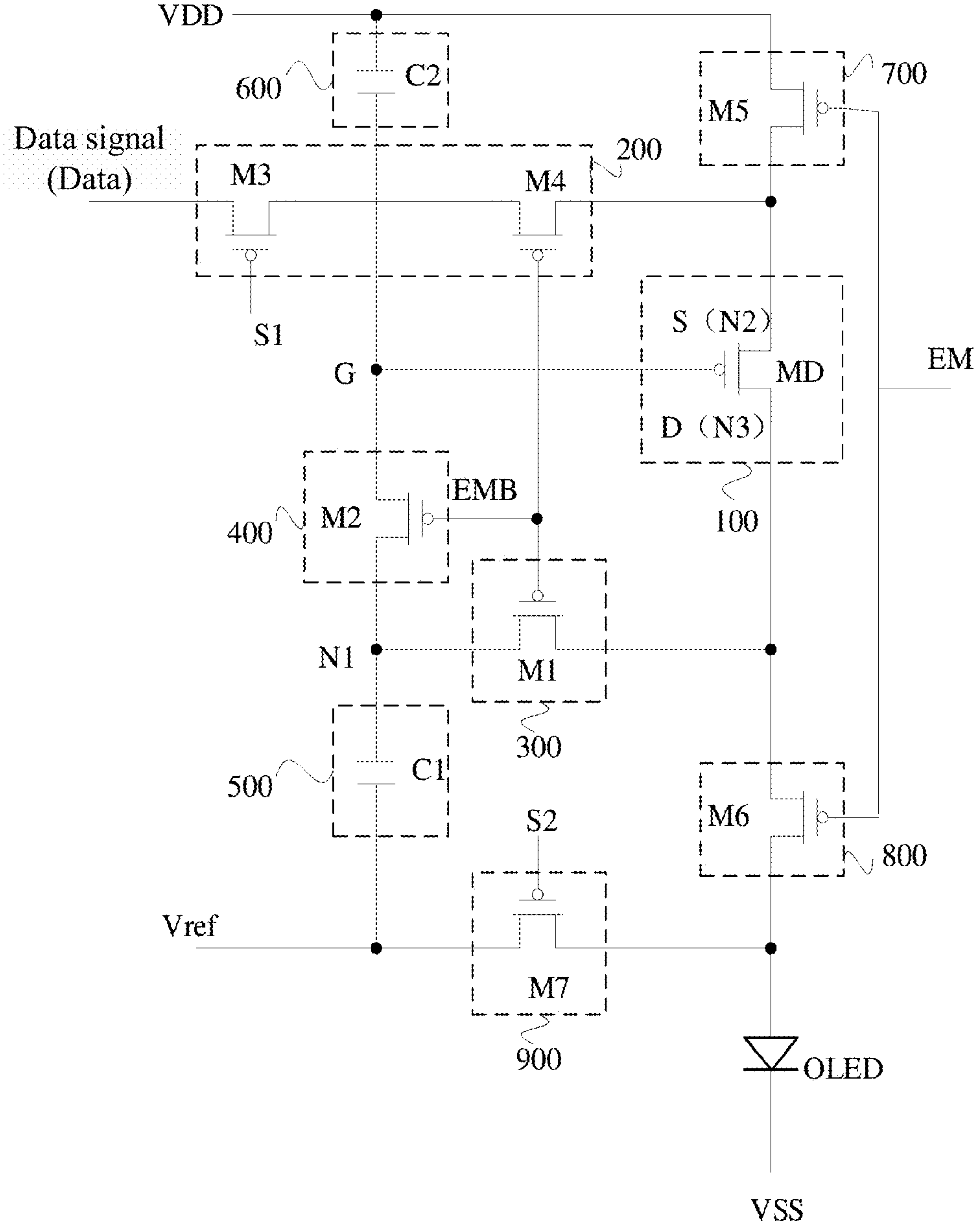
FIG. 7 is a diagram illustrating the structure of another pixel circuit according to an embodiment of the present application.

Referring to FIG. 7, different from the preceding embodiment, the data write module 200 also includes a synchronization control terminal. The synchronization control terminal accesses the first light emission control signal EMB. The data write module 200 transmits the data signal Data under the common control of the first scan signal S1 and the first light emission control signal EMB. In an embodiment, the data write module 200 also includes a fourth transistor M4. The gate of the fourth transistor M4 accesses the first light emission control signal EMB. The fourth transistor M4 is connected in series between the first pole of the third transistor M3 and the first terminal (second node N2) of the drive module 100. In this embodiment of the present application, the reason for the configuration is to reduce the number of vias in the layout without affecting other functions of the pixel circuit.

Figure 8:
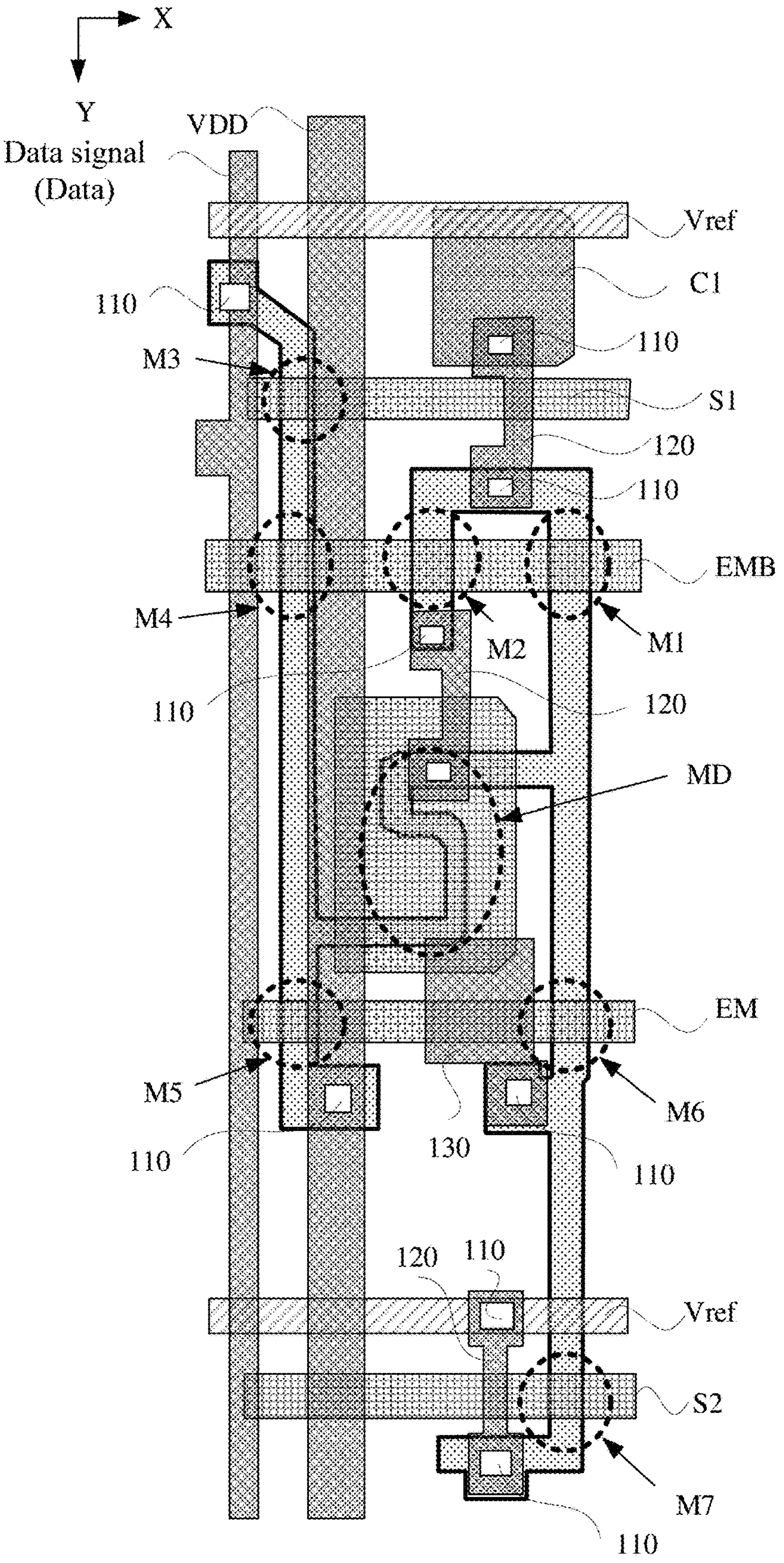
FIG. 8 is a layout diagram of the pixel circuit shown in FIG. 7.

In conjunction with FIGS. 7 and 8, the layout of the pixel circuit includes a first scan line, a first light emission control signal line, a second light emission control signal line, and a second scan line extending in a first direction X and located in a first metal layer. The first scan line transmits the first scan signal S1. The first light emission control signal line transmits the first light emission control signal EMB. The second light emission control signal line transmits the second light emission control signal EM. The second scan line transmits the second scan signal S2.

The layout of the pixel circuit also includes a reference voltage signal line extending in the first direction X and located in a second metal layer. The reference voltage signal line transmits the reference voltage signal Vref.

The layout of the pixel circuit also includes a data line and a first power signal line extending in a second direction Y and located in a third metal layer. The data line transmits the data signal Data.

The first power signal line transmits the first power signal VDD.

The layout of the pixel circuit also includes a semiconductor pattern located in an active layer. Transistors are formed where the semiconductor pattern intersects multiple signal lines located in the first metal layer. The s-shaped portion of the semiconductor pattern intersects the first metal layer to form the drive transistor MD.

The third transistor M3 is formed where the semiconductor pattern intersects the first scan line. The portion where the first scan line intersects the semiconductor pattern is the gate of the third transistor M3, that is, the gate of the third transistor M3 is electrically connected to the first scan line. Portions of the semiconductor pattern on two sides of the first scan line are the first pole and second pole of the third transistor. The second pole of the third transistor M3 is connected to the data line through a via 110. The first pole of the third transistor M3 is electrically connected to the second pole of the fourth transistor M4.

The fourth transistor M4, the second transistor M2, and the first transistor M1 are formed where the semiconductor pattern intersects the first light emission control signal line. The gate of the fourth transistor M4 is electrically connected to the first light emission control signal line. A first pole of the fourth transistor M4 is electrically connected to a first pole of the drive transistor MD. A second pole of the fourth transistor M4 is electrically connected to a first pole of the third transistor M3. The gate of the first transistor M1 is electrically connected to the first light emission control signal line. The first pole of the first transistor M1 is electrically connected to a second pole of the drive transistor MD. The second pole of the first transistor M1 is electrically connected to the second pole of the second transistor M2. The gate of the second transistor M2 is electrically connected to the first light emission control signal line. The first pole of the second transistor M2 is connected to the gate of the drive transistor MD through the via 110 and a connection line 120. The second pole of the second transistor M2 is electrically connected to the second pole of the first transistor M1. For example, the connection line 120 is located in the third metal layer.

The fifth transistor M5 and the sixth transistor M6 are formed where the semiconductor pattern intersects the second light emission control signal line. The gate of the fifth transistor M5 is electrically connected to the second light emission control signal line. The first pole of the fifth transistor M5 is electrically connected to the first pole of the drive transistor MD. The second pole of the fifth transistor M5 is connected to the first power signal line through the via 110. The gate of the sixth transistor M6 is electrically connected to the second light emission control signal line. The first pole of the sixth transistor M6 is electrically connected to the second pole of the drive transistor MD. The second pole of the sixth transistor M6 is electrically connected to the anode 130 of the light emission device through the via 110.

The seventh transistor M7 is formed where the semiconductor pattern intersects the second scan line. The gate of the seventh transistor M7 is electrically connected to the second scan line. The first pole of the seventh transistor M7 is electrically connected to the second pole of the sixth transistor M6. The second pole of the seventh transistor M7 is connected to the reference voltage signal line through the via 110 and the connection line 120.

The gate of the drive transistor MD is used as the plate of the first pole of the second capacitor C2. The plate of the second pole of the second capacitor C2 may be disposed in the third metal layer and is directly electrically connected to the first power signal line. The plate of the second pole of the second capacitor C2 may also be disposed in the second metal layer and is electrically connected to the first power signal line through the disposed via 110.

The plate of the first pole of the first capacitor C1 is located in the second metal layer and is connected to the second pole of the first transistor M1 through the via 110 and the connection line 120. The plate of the second pole of the first capacitor C1 is located in the third metal layer and is connected to the reference voltage signal line through the via 110 and the connection line 120. Alternatively, the plate of the first pole of the first capacitor C1 is located in the third metal layer and is connected to the second pole of the first transistor M1 through the via 110 and the connection line 120. The plate of the second pole of the first capacitor C1 is located in the second metal layer and is directly connected to the reference voltage signal line.

Thus, it can be seen from the layout shown in FIG. 8 that in the lower portion of the third transistor M3, the semiconductor pattern and the first light emission control signal line naturally form the fourth transistor M4, and the existence of the fourth transistor M4 does not affect the function of the pixel circuit. In addition, if M4 is not disposed, it is necessary to break the semiconductor pattern and dispose a via and a connection line so that the semiconductor pattern crosses the first light emission control signal line. Alternatively, the first light emission control signal line is broken, and a via and a connection line are disposed so that the first light emission control signal line crosses the semiconductor pattern. Thus, in this embodiment of the present application, the fourth transistor M4 is added to the pixel circuit, so that the number of vias in the layout is reduced without affecting other functions of the pixel circuit.

From this, it can be seen that the embodiment of this application provides an 8T2C structure pixel circuit. From the perspective of the layout, compared with FIG. 2 and FIG. 8, compared with the 7T1C pixel circuit in the related art, the 8T2C pixel circuit provided in this embodiment of the present application does not add a new signal line. Compared with FIG. 4 and FIG. 8, compared with the 8T1C circuit in the related art, the 8T2C pixel circuit provided in this embodiment of the present application reduces a signal line extending in the first direction X. Thus, in this embodiment of the present application, it is beneficial to save wiring space, and it is beneficial for the high pixels per inch (PPI) design.

In summary, the embodiments of the present application include at least the effects below.

First, the high current retention rate is implemented, and the flicker phenomenon of the display panel is alleviated. Thus, it is beneficial to implement high-quality display at a low frame rate, thereby implementing the effect of low power consumption and high display quality.

Second, the gate G of the drive transistor MD is initialized, and at the same time, the bias voltage state of the drive transistor MD is alleviated, thereby alleviating the afterimage problem.

Third, it is beneficial to save the wiring space, and the high PPI design is implemented.

An embodiment of the present application provides a display panel. The display panel includes the pixel circuit according to any embodiment of the present application and has corresponding effects, and the details are not repeated here.

Figure 9:
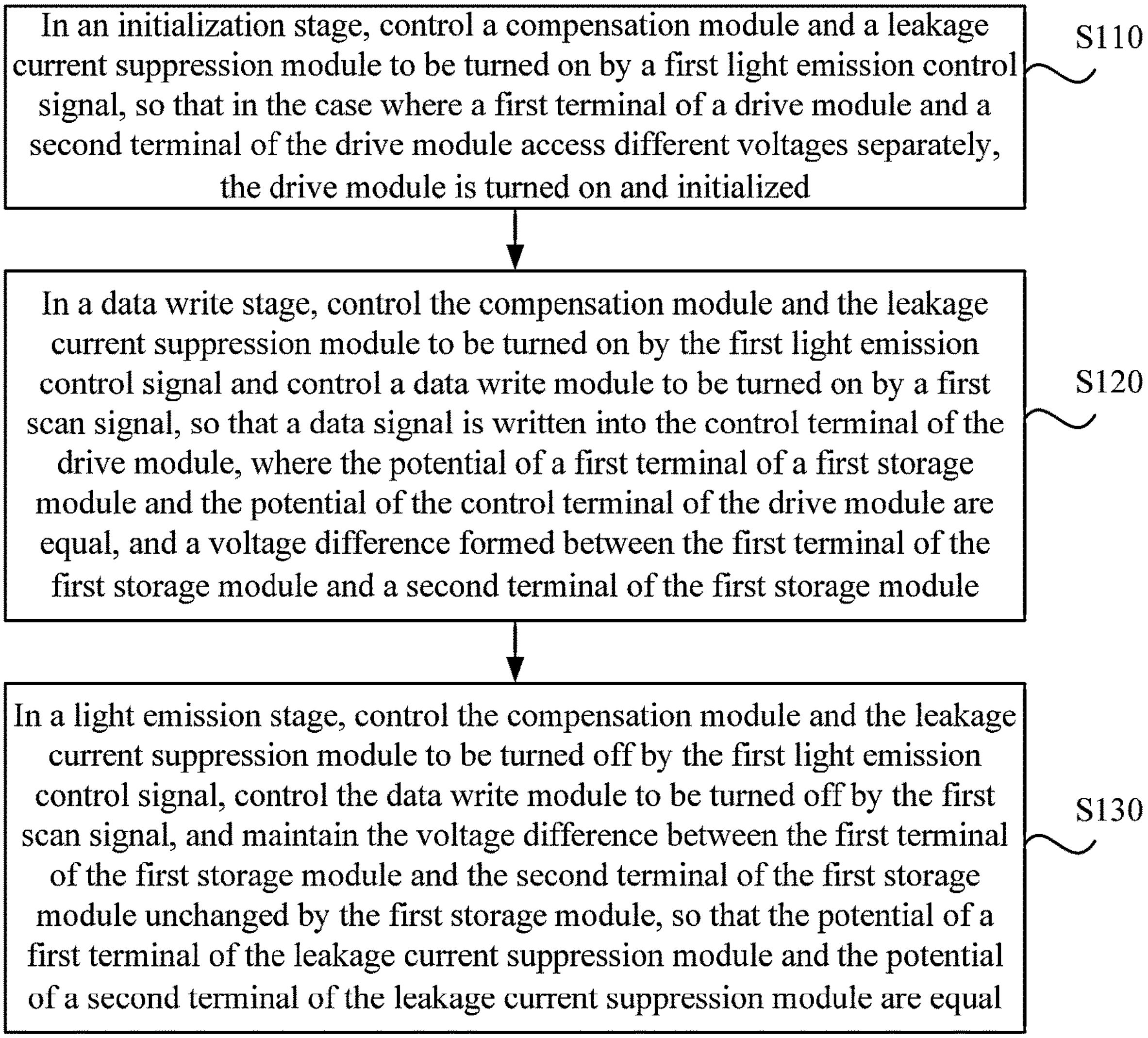
FIG. 9 is a flowchart of a driving method of a pixel circuit according to an embodiment of the present application.

An embodiment of the present application provides a driving method of a pixel circuit. This driving method may be applied to the pixel circuit according to any embodiment of the present application and has corresponding effects. In conjunction with FIGS. 7 and 9, the driving method of a pixel circuit includes the steps below.

In S110, in the initialization stage, the first light emission control signal EMB controls the compensation module 300 and the current leakage suppression module 400 to be turned on, so that in the case where the first terminal of the drive module 100 and the second terminal of the drive module 100 access different voltages separately, the drive module 100 is turned on for initialization.

In S120, in the data write stage, the first light emission control signal EMB controls the compensation module 300 and the current leakage suppression module 400 to be turned on, and the first scan signal S1 controls the data write module 200 to be turned on, so that the data signal Data is written into the control terminal of the drive module 100. The potential of the first terminal of the first storage module 500 and the potential of the control terminal of the drive module 100 are equal. The voltage difference is formed between the first terminal of the first storage module 500 and the second terminal of the first storage module 500.

In S130, in the light emission stage, the first light emission control signal EMB controls the compensation module 300 and the current leakage suppression module 400 to be turned off. The first scan signal S1 controls the data write module 200 to be turned off. The first storage module 500 maintains the voltage difference between the first terminal of the first storage module 500 and the second terminal of the first storage module 500 unchanged. In this manner, the potential of the first terminal of the current leakage suppression module 400 and the potential of the second terminal of the current leakage suppression module 400 are equal.

On the basis of the preceding embodiment, in another embodiment, the initialization stage includes a first initialization sub-stage and a second initialization sub-stage.

In the first initialization sub-stage, the first light emission control signal EMB controls the compensation module 300 and the current leakage suppression module 400 to be turned on. The second light emission control signal EM controls the first light emission control module 700 and the second light emission control module 800 to be turned on. The second scan signal S2 controls the initialization module 900 to be turned on. In this manner, the drive module 100 is turned on, and the generated drive current flows out through the initialization module 900. The drive module 100 is turned on, and a relatively large current flows. The control terminal (gate G) of the drive module 100 is initialized, and at the same time, the bias voltage state of the drive module 100 is alleviated, thereby alleviating the afterimage problem.

In the second initialization sub-stage, the second light emission control signal EM controls the first light emission control module 700 and the second light emission control module 800 to be turned off. The reference voltage signal Vref continues to initialize the anode of the light emission device OLED.

Figure 10:
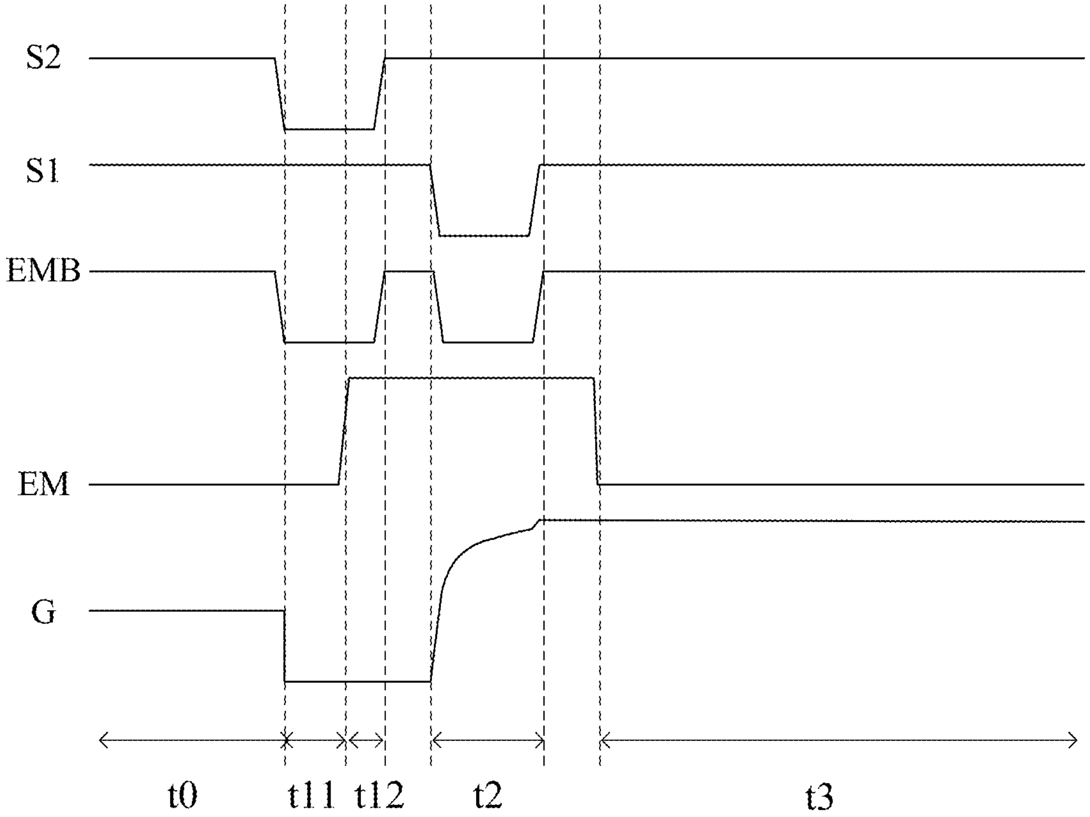
FIG. 10 is a drive timing diagram of a pixel circuit according to an embodiment of the present application.

FIG. 10 is a drive timing diagram of a pixel circuit according to an embodiment of the present application. The drive process of the pixel circuit is described below with reference to FIGS. 7 and 10.

In the first initialization sub-stage t11, the second scan signal S2, the first light emission control signal EMB, and the second light emission control signal EM are at low levels. The first transistor M1, the second transistor M2, the fifth transistor M5, the sixth transistor M6, and the seventh transistor M7 are turned on. The gate G of the drive transistor MD and the anode of the light emission device OLED are reset at the same time. The reference voltage signal Vref is written into the gate G of the drive transistor MD. At this time, a relatively large current flows through the drive transistor MD. In this manner, the bias voltage state of the drive transistor MD is alleviated, thereby alleviating the afterimage problem.

In the second initialization sub-stage t12, different from the first initialization stage t11, the second light emission control signal EM changes from a low level to a high level, the fifth transistor M5 and the sixth transistor M6 are turned off, and the drive transistor MD no longer generates a large current. The potential of the gate G is maintained by the first capacitor C1. The reference voltage signal Vref continues to initialize the anode of the light emission device OLED.

In the data write stage t2, the second scan signal S2 is at a high level, and the seventh transistor M7 is turned off. The first scan signal S1 and the first light emission control signal EMB are at low levels. The third transistor M3, the fourth transistor M4, the first transistor M1, and the second transistor M2 are turned on. The data signal Data is written to the gate G and the first node N1 through the third transistor M3, the fourth transistor M4, the drive transistor MD, the first transistor M1, and the second transistor M2, that is, to the first capacitor C1 and the second capacitor C2. Since the reference voltage signal Vref is lower than the voltage of the data signal Data, in the data write stage t2, the potential of the gate G gradually rises.

In the light emission stage t3, the first scan signal S1 and the first light emission control signal EMB are at high levels. The third transistor M3, the fourth transistor M4, the first transistor M1, and the second transistor M2 are turned off. The second light emission control signal EM is at a low level. The fifth transistor M5 and the sixth transistor M6 are turned on. The light emission device OLED is lit. Meanwhile, the first capacitor C1 and the second capacitor C2 lock the potential of the first node N1 and the potential of the gate G. Since the potential of the first node N1 and the potential of the gate G are close, the leakage current of the second transistor M2 is small Thus, the potential of the gate G is more stable, thereby alleviating the flicker problem of the display panel.

Further referring to FIG. 10, stage t0 is an initial state and may be considered as the light emission stage of the previous frame.

FIG. 10 exemplarily shows that a first transition stage is included between the second initialization sub-stage t12 and the data write stage t2. In the first transition stage, the second scan signal S2 changes from a low level to a high level, and the first light emission control signal EMB changes from a low level to a high level. This is not limited in the present application. In other embodiments, the first transition stage may not be configured. The second scan signal S2 changes from a low level to a high level in the data write stage t2, and the first light emission control signal EMB maintains at a low level in the initialization stage and the data write stage t2.

FIG. 10 exemplarily shows that a second transition stage is included between the data write stage t2 and the light emission stage t3. In the second transition stage, the first scan signal S1 and the first light emission control signal EMB are changed from low levels to high levels. This is not limited in the present application. In other embodiments, the second transition stage may not be configured. The first scan signal S1 and the first light emission control signal EMB change from low levels to high levels in the light emission stage t3.

What is claimed is:

1. A pixel circuit, comprising:
- a drive module comprising a control terminal, a first terminal, and a second terminal;
- a data write module comprising a scan control terminal, a first terminal, and a second terminal, wherein the first terminal of the data write module is electrically connected to the first terminal of the drive module, the second terminal of the data write module accesses a data signal, and the scan control terminal of the data write module accesses a first scan signal;
- a compensation module comprising a control terminal, a first terminal, and a second terminal, wherein the first terminal of the compensation module is electrically connected to the second terminal of the drive module, and the control terminal of the compensation module accesses a first light emission control signal;
- a current leakage suppression module comprising a control terminal, a first terminal, and a second terminal, wherein the first terminal of the current leakage suppression module is electrically connected to the control terminal of the drive module, the second terminal of the current leakage suppression module is electrically connected to the second terminal of the compensation module, the control terminal of the current leakage suppression module accesses the first light emission control signal, and the current leakage suppression module and the compensation module are turned on in an initialization stage and a data write stage; and a first storage module comprising a first terminal and a second terminal, wherein the first terminal of the first storage module is electrically connected to the second terminal of the compensation module, the second terminal of the first storage module accesses a reference voltage signal, and the first storage module is configured to maintain a voltage difference formed between the first terminal of the first storage module and the second terminal of the first storage module unchanged in the data write stage and a light emission stage.

2. The pixel circuit according to claim 1, wherein the compensation module comprises:

a first transistor, wherein a first pole of the first transistor is electrically connected to the second terminal of the drive module, a second pole of the first transistor is electrically connected to the second terminal of the current leakage suppression module, and a gate of the first transistor accesses the first light emission control signal.

3. The pixel circuit according to claim 1, wherein the current leakage suppression module comprises:

a second transistor, wherein a first pole of the second transistor is electrically connected to the control terminal of the drive module, a second pole of the second transistor is electrically connected to the second terminal of the compensation module, and a gate of the second transistor accesses the first light emission control signal.

4. The pixel circuit according to claim 1, wherein the first storage module comprises:

a first capacitor, wherein a first pole of the first capacitor is electrically connected to the second terminal of the compensation module, and a second pole of the first capacitor accesses the reference voltage signal.

5. The pixel circuit according to claim 1, wherein the data write module comprises:

a third transistor, wherein a first pole of the third transistor is electrically connected to the first terminal of the drive module, a second pole of the third transistor accesses the data signal, and a gate of the third transistor accesses the first scan signal.

6. The pixel circuit according to claim 1, wherein the data write module further comprises a synchronization control terminal, the synchronization control terminal accesses the first light emission control signal, and the data write module transmits the data signal under common control of the first scan signal and the first light emission control signal.

7. The pixel circuit according to claim 6, wherein the data write module comprises:

a third transistor, wherein a second pole of the third transistor accesses the data signal, and a gate of the third transistor accesses the first scan signal; and a fourth transistor, wherein a first pole of the fourth transistor is electrically connected to the first terminal of the drive module, a second pole of the fourth transistor is electrically connected to a first pole of the third transistor, and a gate of the fourth transistor accesses the first light emission control signal.

8. The pixel circuit according to claim 1, further comprising:

a second storage module comprising a first terminal and a second terminal, wherein the first terminal of the second storage module is electrically connected to the control terminal of the drive module, the second terminal of the second storage module accesses a first power signal, and the second storage module is configured to maintain a potential of the control terminal of the drive module unchanged in the light emission stage.

9. The pixel circuit according to claim 8, wherein the second storage module comprises a second capacitor, a first pole of the second capacitor is electrically connected to the control terminal of the drive module, and a second pole of the second capacitor accesses the first power signal.

10. The pixel circuit according to claim 1, further comprising:

a first light emission control module comprising a control terminal, a first terminal, and a second terminal, wherein the first terminal of the first light emission control module is electrically connected to the first terminal of the drive module, the second terminal of the first light emission control module accesses a first power signal, and the control terminal of the first light emission control module accesses a second light emission control signal;

a second light emission control module comprising a control terminal, a first terminal, and a second terminal, wherein the first terminal of the second light emission control module is electrically connected to the second terminal of the drive module, the second terminal of the second light emission control module is electrically connected to a light emission device, and the control terminal of the second light emission control module accesses the second light emission control signal; and an initialization module comprising a control terminal, a first terminal, and a second terminal, wherein the first terminal of the initialization module is electrically connected to the second terminal of the second light emission control module, the second terminal of the initialization module accesses an initialization signal, and the control terminal of the initialization module accesses a second scan signal; and the first light emission control module, the second light emission control module, and the initialization module are simultaneously turned on in the initialization stage.

11. The pixel circuit according to claim 10, wherein the first light emission control module comprises a fifth transistor, a first pole of the fifth transistor is electrically connected to the first terminal of the drive module, a second pole of the fifth transistor accesses the first power signal, and a gate of the fifth transistor accesses the second light emission control signal.

12. The pixel circuit according to claim 10, wherein the second light emission control module comprises a sixth transistor, a first pole of the sixth transistor is electrically connected to the second terminal of the drive module, a second pole of the sixth transistor is electrically connected to the light emission device, and a gate of the sixth transistor accesses the second light emission control signal.

13. The pixel circuit according to claim 10, wherein the initialization module comprises a seventh transistor, a first pole of the seventh transistor is electrically connected to the second terminal of the second light emission control module, a second pole of the seventh transistor accesses the initialization signal, and a gate of the seventh transistor accesses the second scan signal.

14. The pixel circuit according to claim 11, wherein the reference voltage signal is multiplexed as the initialization signal.

15. The pixel circuit according to claim 10, wherein the light emission device comprises an anode and a cathode, the second terminal of the second light emission control module is electrically connected to the anode of the light emission device, and the cathode of the light emission device accesses a second power signal.

16. A display panel, comprising the pixel circuit according to claim 1.

17. A driving method of a pixel circuit, wherein the pixel circuit comprises a drive module, a current leakage suppression module, a data write module, a compensation module, and a first storage module, wherein a first terminal of the data write module is electrically connected to a first terminal of the drive module, a second terminal of the data write module accesses a data signal, and a control terminal of the data write module accesses a first scan signal; a first terminal of the compensation module is electrically connected to a second terminal of the drive module, and a control terminal of the compensation module accesses a first light emission control signal; a first terminal of the current leakage suppression module is electrically connected to a control terminal of the drive module, a second terminal of the current leakage suppression module is electrically connected to a second terminal of the compensation module, and a control terminal of the current leakage suppression module accesses the first light emission control signal; and a first terminal of the first storage module is electrically connected to the second terminal of the compensation module, and a second terminal of the first storage module accesses a reference voltage signal; and the driving method comprises:

controlling the compensation module and the current leakage suppression module to be turned on by the first light emission control signal during an initialization stage in a case where the first terminal of the drive module and the second terminal of the drive module separately access different voltages, the drive module is turned on for initialization;

controlling the compensation module and the current leakage suppression module to be turned on by the first light emission control signal, and controlling the data write module to be turned on by the first scan signal during a data write stage, the data signal is written into the control terminal of the drive module, wherein a potential of the first terminal of the first storage module and a potential of the control terminal of the drive module are equal, and a voltage difference is formed between the first terminal of the first storage module and the second terminal of the first storage module; and controlling the compensation module and the current leakage suppression module to be turned off by the first light emission control signal, controlling the data write module to be turned off by the first scan signal, and maintaining the voltage difference between the first terminal of the first storage module and the second terminal of the first storage module unchanged by the first storage module during a light emission stage, a potential of the first terminal of the current leakage suppression module and a potential of the second terminal of the current leakage suppression module are equal.

18. The method according to claim 17, wherein the pixel circuit further comprises a first light emission control module, a second light emission control module, and an initialization module, wherein a first terminal of the first light emission control module is electrically connected to the first terminal of the drive module, a second terminal of the first light emission control module accesses a first power signal, and a control terminal of the first light emission control module accesses a second light emission control signal, wherein a first terminal of the second light emission control module is electrically connected to the second terminal of the drive module, a second terminal of the second light emission control module is electrically connected to a light emission device, and a control terminal of the second light emission control module accesses the second light emission control signal; and a first terminal of the initialization module is electrically connected to the second terminal of the second light emission control module, a second terminal of the initialization module accesses an initialization signal, and a control terminal of the initialization module accesses a second scan signal;

the initialization stage comprises a first initialization sub-stage and a second initialization sub-stage, wherein in the first initialization sub-stage, the first light emission control signal controls the compensation module and the current leakage suppression module to be turned on, the second light emission control signal controls the first light emission control module and the second light emission control module to be turned on, the second scan signal controls the initialization module to be turned on, and the reference voltage signal initializes a gate of a drive transistor and an anode of the light emission device; and in the second initialization sub-stage, the second light emission control signal controls the first light emission control module and the second light emission control module to be turned off, and the reference voltage signal initializes the anode of the light emission device;

in the data write stage, the second scan signal controls the initialization module to be turned off, and the first scan signal controls the data write module to be turned on; and in the light emission stage, the first scan signal controls the data write module to be turned off, the first light emission control signal controls the compensation module and the current leakage suppression module to be turned off, and the second light emission control signal controls the first light emission control module and the second light emission control module to be turned on.

19. The method according to claim 18, wherein a first transition stage is comprised between the second initialization sub-stage and the data write stage, wherein the driving method further comprises:

controlling the initialization module to be turned off by the second scan signal, and controlling the compensation module and the current leakage suppression module to be turned off by the first light emission control signal during the first transition stage.

20. The method according to claim 18, wherein a second transition stage is comprised between the data write stage and the light emission stage, wherein the driving method further comprises:

controlling the data write module to be turned off by the first scan signal, and controlling the compensation module and the current leakage suppression module to be turned off by the first light emission control signal during the second transition stage.

* * * * *